Sept. 8, 1925.                                                    1,552,644
                         D. W. PERIN
    APPARATUS FOR ALIGNING TRUCK BODIES WITH PLATFORMS AND THE LIKE
                 Original Filed Sept. 20, 1920    2 Sheets—Sheet 1
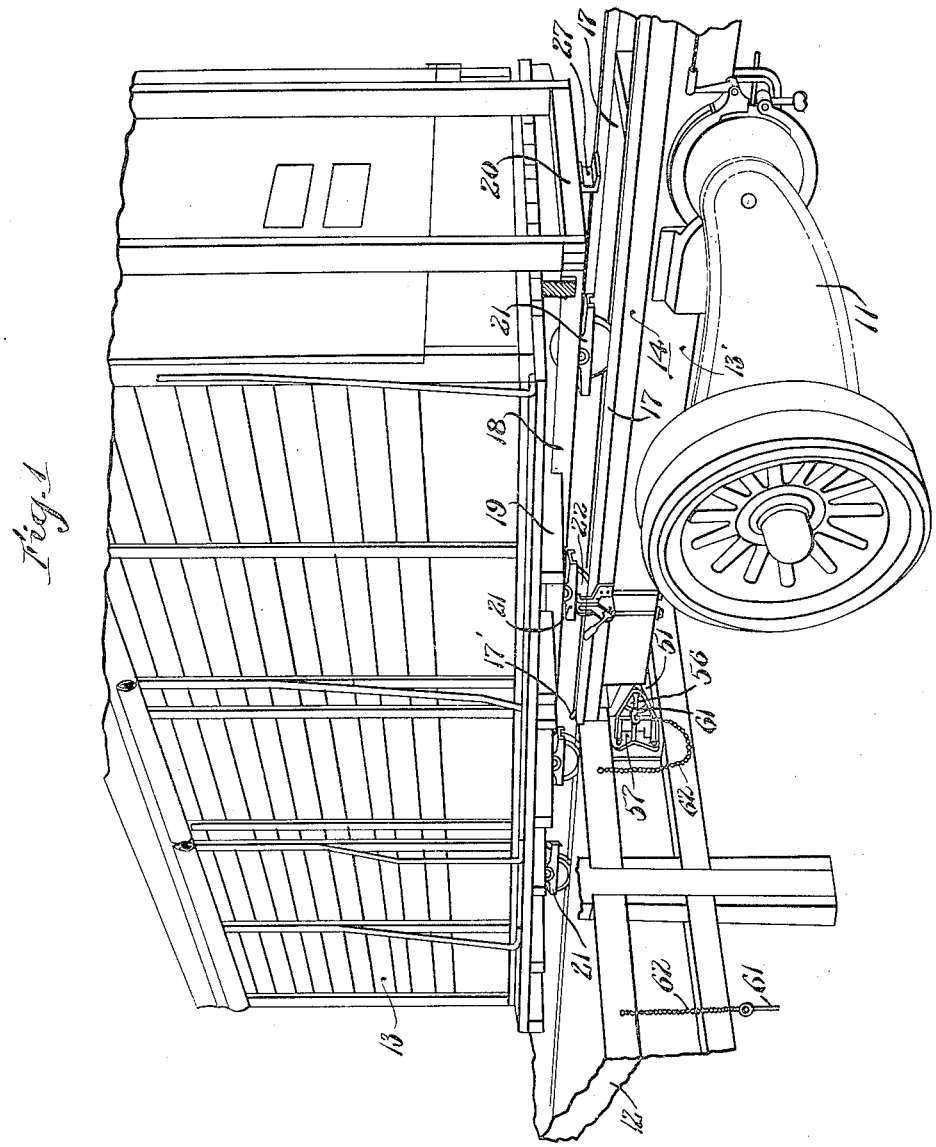

Sept. 8, 1925.
D. W. PERIN
1,552,644
APPARATUS FOR ALIGNING TRUCK BODIES WITH PLATFORMS AND THE LIKE
Original Filed Sept. 20, 1920    2 Sheets-Sheet 2
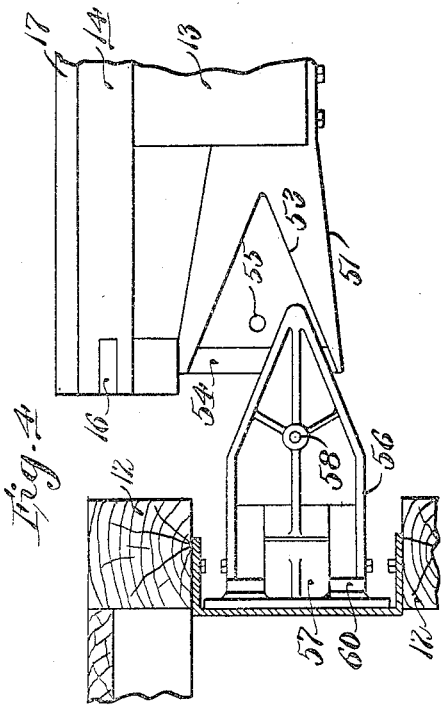
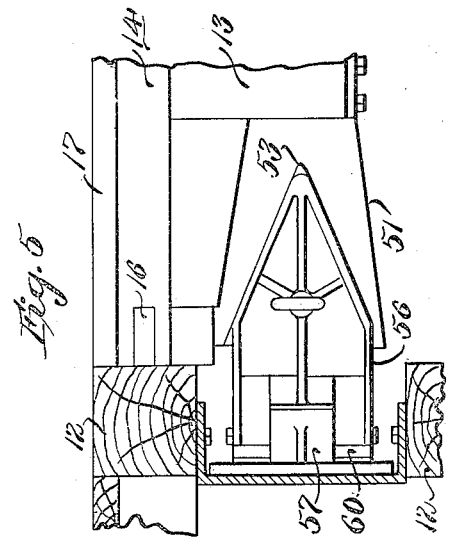
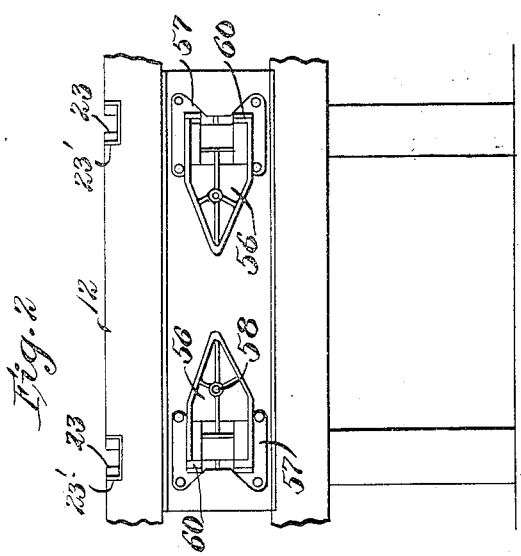
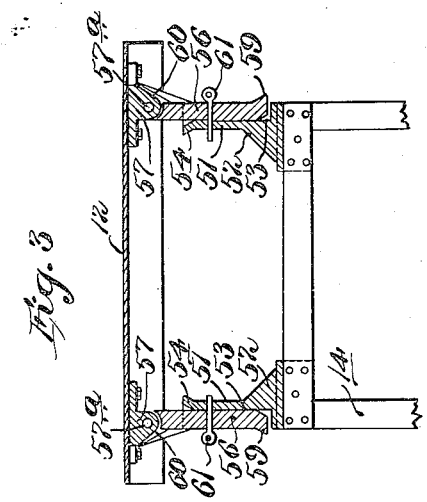
Inventor;
Donald W. Perin,
by Roberts, Roberts & Cushman
his attys.

Patented Sept. 8, 1925.

1,552,644

UNITED STATES PATENT OFFICE.

DONALD W. PERIN, OF BROOKLINE, MASSACHUSETTS, ASSIGNOR, BY MESNE ASSIGNMENTS, TO PERIN-WALSH COMPANY, OF BOSTON, MASSACHUSETTS, A CORPORATION OF MASSACHUSETTS.

APPARATUS FOR ALIGNING TRUCK BODIES WITH PLATFORMS AND THE LIKE.

Original application filed September 20, 1920, Serial No. 411,711. Divided and this application filed February 24, 1922. Serial No. 539,020.

*To all whom it may concern:*

Be it known that I, DONALD W. PERIN, a citizen of the United States of America, and resident of Brookline, in the county of Norfolk and State of Massachusetts, have invented new and useful Improvements in Apparatus for Aligning Truck Bodies with Platforms and the like, of which the following is a specification.

This invention relates to apparatus for aligning truck bodies with platforms to facilitate and expedite loading and unloading, and is a division of my copending application Serial No. 411,711, filed September 20, 1920, now Patent No. 1,418,966, entitled Removable body construction.

In the use of motor trucks for transportation of merchandise with a fixed body, the vehicle is of necessity halted for extended periods for loading and unloading the merchandise. In city work where the hauls are short this idle time may run into a high proportion of the total time, thus utilizing very inefficiently the motor vehicle itself with its high initial maintenance, and operation costs. For this and other reasons vehicles with removable bodies are becoming more and more popular.

The problem of rapid loading, however, is not entirely solved by using removable body equipment. These removable bodies are ordinarily provided with wheels or similar devices running in tracks or grooves on the vehicle chassis. Moreover, in a motor vehicle there is a considerable variation in the height of the chassis top when it has a fully loaded body upon it and when it has no body upon it. This is due both to the compression of the springs and of the tires. In order then to effectively use a removable body it is essential to provide means for adjusting the relative heights of the vehicle chassis and of the platform to or from which the body is to be moved. Failure to align the chassis with the platform in a vertical direction means difficulty and delay in changing bodies and possible breakage of or damage to the wheels thereon, particularly when the bodies are heavily loaded. Lack of alignment of the wheels of the body with the tracks on the chassis in a horizontal direction is also frequently the cause of serious delays or mishaps.

It is an object of my invention to provide means whereby a truck and a platform may be brought and maintained in registration both vertically and horizontally.

It is an object to provide means for accomplishing this purpose, which means are simple in construction, positive in their operation and relatively inexpensive to manufacture. Other and further objects will appear as the description proceeds.

The invention comprises interengaging members on the platform and on the chassis adapted to raise or lower the vehicle body to the level of the platform. It further comprises means for moving the vehicle body laterally, particularly when tracks are provided on both the chassis and the platform. After the chassis has been brought into proper registration with the platform, it is made fast in that position until the loading operation is completed. In its preferred form the invention comprises interengaging wedge means upon the vehicle chassis and the loading platform, said means being arranged to have a lateral wedging action whereby the vehicle is moved into lateral alignment with the platform as well as raised or lowered to the platform level. The wedge means on the platform are preferably arranged to be disposed within the contour of the platform when not in use.

I have shown a preferred embodiment of my invention in the accompanying drawings, in which:—

Fig. 1 is a perspective view, partly broken away showing the body partly removed from the vehicle chassis;

Fig. 2 is a fragmentary view showing the platform registration members in folded back position;

Fig. 3 is a fragmentary plan view partly in section showing the platform and vehicle registration members in engagement;

Fig. 4 is a fragmentary side view showing the platform and vehicle registration members as they enter into engagement; and Fig. 5 is a view similar to Fig. 4 but showing the members fully engaged.

In Fig. 1, a motor truck chassis 11 is shown backed up to a platform 12 and the body 13 is shown partly removed from the truck onto the platform. The truck chassis is formed with the longitudinal bearing members 13' and to these is attached the fixed sub frame 14. The U-shaped rail 17 is bolted to the upper surface of each side member of the sub frame 14, the rear end of these rails being flared as shown at 17' in Fig. 1.

The movable body frame 18 is notched into the sills 19 on the under side of the vehicle body 13 as shown in Fig. 1. This frame is also provided with cross braces 20. At points between sills the longitudinal members of the body frame 18 carry the journal housings 21 in which are journaled the bearing wheels 22. These wheels fit into the U rail 17 with which they have an easy rolling contact. The platform 12 is provided with similar rails 23 adapted to receive the wheels as shown in Fig. 1, the outer end of these rails being flared as shown at 23' in Fig. 2.

The V blocks or wedges 51 are attached by bolts or rivets to the rear end of the chassis frame 13 as best shown in Figs. 3, 4 and 5. These blocks are rigid and are inwardly knee braced at 52. The outer side of each block is formed with the rearwardly diverging V-shaped recess 53, the rear portion of which is flared inwardly at 54. The V blocks are perforated at 55.

The wedge blocks 56 are attached by the base members 57 to the front portion of the loading platform 12, the wedge members being pivotedly connected to the base members by pivot pins 57ª. The wedge blocks 56 are similar in shape and size to the V-shaped recesses in the V blocks, and are provided with the perforations 58 adapted to register with the perforations 55 in the V blocks.

The point of the wedge block is flared outwardly at 59 as shown in Fig. 3 and its portion adjacent the base member 57 is provided with the feet 60 adapted to bear against the base member and prevent outward movement of the wedge block on its pivot beyond the position in which they are shown in Fig. 3. The pins 61 adapted to fit in the perforations 55 and 58 are provided, and are preferably hung upon the platform 12 adjacent the wedge blocks by chains 62.

In the use of my device, assuming the vehicle to have an empty body upon it, the wedge blocks 56 are swung outward into the position in which they are shown in Figs. 3, 4 and 5, and the vehicle is backed up to the platform, the V blocks 51 engaging the wedge blocks 56 as shown in Fig. 4 if unloaded, while if loaded the upper part of the wedge block engages the V block. The outward flare 59 of the wedge blocks and inward flare of the V blocks permits the two V blocks to pass between the wedge blocks even if the vehicle is backed a short distance to right or left of the correct position and the wedging action will shift the vehicle into proper lateral alignment, the feet 60 supporting the wedge blocks against side thrust.

The wedge blocks are permanently secured to the platform face at a height intermediate the position which the V blocks will take when the vehicle chassis is entirely without load, and that the V blocks will occupy when the chassis carries a fuly loaded body. In the present case, the body being empty the V and wedge blocks will have the relation shown in Fig. 4. As the vehicle is moved backward the lower side of the wedge blocks bear against the lower sides of the V recesses 53 in the V blocks and the vehicle chassis is forced downward by the cam or wedge action until the parts assume the position shown in Fig. 5. The pins 61 are then inserted to maintain the chassis in close engagement with the platform. During this process the chassis has been forced downward and the vehicle springs and tires compressed. This position, however, as has been stated, is not as low as that the chassis would take when carrying a fully loaded body so that the strain on tires or springs is not injurious.

The fastenings which retain the body on the chassis are removed and the body is released for movement rearwardly. It rolls freely in the tracks 17 and may be readily hauled by hand off the truck chassis onto the platform. The platform may be provided with tracks of such an extent that the empty body may be rolled and switched to one side and a new body rolled onto the chassis over the same tracks, or where space is limited, it may be necessary now to pull out the pins 61 and drive the chassis to another such set of wedge blocks having a loaded body upon tracks adjacent them. In either case the loaded body is rolled manually onto the chassis.

The pins 61 are now removed and the vehicle is loaded and ready for movement. When discharging its loaded body and receiving another body at the other end of the run the procedure is identical with the exception that, since the chassis with its full load is somewhat lower than the level shown in Fig. 5, when the truck is backed up, the upper sides of the wedge blocks 56 will engage the upper side of the V recesses 53 and the rear of the chassis will be lifted to the level of the platform.

The wheels 22 are relatively large and move freely in the tracks 17 and since the chassis and platform are always upon the same level when a body is removed or replaced it is unnecessary to provide any mechanical means for moving the bodies on or off. Even a heavily loaded body may be readily moved by hand.

An important feature in regard to the wedge blocks is their ability to be folded back upon their hinges so that they do not project beyond the face of the platform. This permits trucks not provided with my device to be driven up to the same platform if desired and also permits the use of my device upon platforms abutting upon a street or side walk where city regulations prevent the use of permanent extensions or ramps.

The whole construction is simple and is inexpensive to manufacture and is positive and effective in its operation. While my aligning apparatus has been here shown and described as especially adapted for use with trucks having removable bodies, it is clear that my invention is not limited to such use but may be employed to advantage with trucks having fixed bodies.

I claim:

1. A vehicle of the type having springs between the wheels and body characterized by upwardly and downwardly inclined guides on the body adapted to cooperate with guiding means on a loading platform automatically to raise or lower the body into alignment with the platform when the vehicle is moved into loading position.

2. In combination with a vehicle and a loading platform for said vehicle, interengaging means upon the vehicle chassis and the loading platform adapted to move the chassis either upwardly or downwardly into alignment with the platform level upon the engagement of said means, and means to lock said interengaging means in fixed relation when engaged.

3. In combination with a vehicle and a loading platform for said vehicle, interengaging means having oppositely inclined surfaces upon the vehicle chassis and the loading platform adapted to move the chassis into alignment with the platform level upon the engagement of said means, each of said means having an opening so disposed that the openings are in registration when said means are fully engaged, and a member adapted to be inserted in said registered openings to lock said interengaging means in fixed position.

4. In combination with a vehicle and a loading platform for said vehicle, interengaging means having oppositely inclined surfaces upon the vehicle chassis and the loading platform adapted to move the chassis into alignment with the platform level upon the engagement of said means, each of said means having an opening so disposed that the openings are in registration when said means are fully engaged, and a pin suspended from said platform and adapted to be inserted in said registered openings to lock said interengaging means in fixed position.

5. Means for automatically aligning a vehicle body with a loading platform comprising a wedge-shaped guide mounted on one of said parts and a complemental guide mounted on the other part, one of said guides projecting from its part when in operative position and being retractable to an inoperative position.

6. In combination with a vehicle and a loading platform for said vehicle, oppositely inclined surfaces upon the vehicle chassis and the loading platform adapted to lift or lower the chassis to the platform level upon the engagement of the surfaces.

7. In combination with a vehicle, a loading platform for said vehicle, and interengaging V and pointed guides located in a vertical plane upon the vehicle chassis and a loading platform adapted to lift or lower the chassis to the platform level upon their interengagement.

8. In combination with a vehicle and a loading platform for said vehicle, interengaging means upon the vehicle chassis and the loading platform adapted to move the chassis either upwardly or downwardly to the platform level upon the engagement of said means, said means having portions adapted to laterally align the vehicle and platform upon engagement of said portions.

9. In combination with a vehicle, a loading platform for said vehicle, and interengaging double guides upon the vehicle chassis and the loading platform adapted to lift or lower the chassis to the platform level upon the engagement of the guides, the guides being formed to have a lateral wedging action to bring the vehicle and platform into lateral alignment.

10. In combination with a vehicle and a loading platform for said vehicle, interengaging means upon the vehicle chassis and the loading platform adapted to move the chassis to the platform level upon the engagement of said means, said means comprising interengaging V and pointed guides located in a vertical plane upon the vehicle chassis and loading platform adapted to lift or lower the chassis to the platform level upon their interengagement, the guides also being shaped to have a guiding action in a horizontal plane to bring the vehicle and platform into lateral alignment.

11. In combination with a vehicle and a loading platform for said vehicle, guides having V-shaped recesses upon the rear of the vehicle chassis, the V recesses being placed in a vertical plane with their flared end opening rearwardly, and pointed wedges upon the platform adapted to engage the V recesses to move the vehicle to the plane of the platform.

12. In combination with a vehicle and a loading platform for said vehicle, a pair of guides having V-shaped recesses upon the rear of the vehicle chassis, the V recesses being placed in a vertical plane with their flared end opening rearwardly, and pointed wedges upon the platform adapted to engage the V recesses to move the vehicle to the plane of the platform, the V-shaped guides fitting between the pointed wedges laterally of the vehicle.

13. In combination with a vehicle and a loading platform for said vehicle, a pair of V shaped guides upon the rear of the vehicle chassis, the guides being placed in a vertical plane with their flared end opening rearwardly, and pointed wedges upon the platform adapted to engage the V shaped guides fitting between the pointed wedges laterally of the vehicle and portions of the guides being laterally flared to give a lateral wedging action and bring the vehicle and platform into lateral alignment.

14. As an article of manufacture, a guide for a vehicle loading platform having a pair of spaced wedge members hinged in such manner as to be folded against the platform when swung in one direction and means preventing swinging movement in the opposite direction beyond a certain point.

15. As an article of manufacture, a block adapted to be attached to the rear end of a vehicle chassis, said block having a V-shaped recess in one face thereof.

16. As an article of manufacture, a knee-braced block adapted to be made fast to the rear end of a vehicle chassis, said block having a V-shaped recess in the face opposite the one which is knee-braced.

17. As an article of manufacture, a block adapted to be attached to the rear end of a vehicle chassis, said block having a V-shaped recess in one face thereof and a flared outer end.

18. A device for guiding a vehicle into alignment with a loading platform comprising a mounting base and a wedge pivoted on the base to swing to and from a position approximately perpendicular to the base.

19. A device for guiding a vehicle into alignment with a loading platform comprising surfaces inclining away from a plane therebetween and means for supporting said surfaces to swing about an axis perpendicular to said plane.

20. Means for aligning a vehicle body with a loading platform comprising a pair of wedges and a pair of complemental guides for the vehicle and platform respectively, the wedges and guides having lateral engaging surfaces to position the vehicle transversely of the wedges.

21. Means for aligning a vehicle body with a loading platform comprising complemental guides for the vehicle and platform respectively, the guides having surfaces respectively inclining upwardly and downwardly and sidewise in both directions, thereby to guide the vehicle either upwardly or downwardly or to either side.

Signed by me at Boston, Massachusetts, this twenty-first day of February, 1922.

DONALD W. PERIN.